(12) United States Patent
Mizutani et al.

(10) Patent No.: US 8,874,387 B2
(45) Date of Patent: Oct. 28, 2014

(54) AIR FLOW MEASUREMENT DEVICE AND AIR FLOW CORRECTION METHOD

(75) Inventors: Akitoshi Mizutani, Okazaki (JP); Takao Ban, Toyohashi (JP)

(73) Assignee: Denso Corporation, Kariya (JP)

( * ) Notice: Subject to any disclaimer, the term of this patent is extended or adjusted under 35 U.S.C. 154(b) by 13 days.

(21) Appl. No.: 12/473,660

(22) Filed: May 28, 2009

(65) Prior Publication Data

US 2009/0299657 A1  Dec. 3, 2009

(30) Foreign Application Priority Data

May 30, 2008  (JP) ................................. 2008-142686

(51) Int. Cl.
| G01F 1/00 | (2006.01) |
| G01F 1/696 | (2006.01) |
| F02D 41/18 | (2006.01) |
| G01F 1/68 | (2006.01) |

(52) U.S. Cl.
CPC .............. *G01F 1/6965* (2013.01); *G01F 1/696* (2013.01); *F02D 41/187* (2013.01); *G01F 1/68* (2013.01); *F02D 2200/0414* (2013.01); *F02D 41/18* (2013.01)
USPC ................. 702/45; 702/47; 702/99; 702/100; 702/130

(58) Field of Classification Search
USPC ................................ 702/45, 47, 99, 100, 130
See application file for complete search history.

(56) References Cited

U.S. PATENT DOCUMENTS

| 4,800,859 A * | 1/1989 | Sagisaka et al. ............... 123/497 |
| 4,807,151 A * | 2/1989 | Citron ............................. 702/47 |
| 5,995,907 A * | 11/1999 | Van Bemmel et al. ......... 702/16 |
| 6,230,559 B1 | 5/2001 | Igarashi et al. |
| 6,321,165 B1 | 11/2001 | Ohta et al. |
| 6,397,673 B1 * | 6/2002 | Kanke et al. ................ 73/204.11 |
| 2007/0125169 A1 * | 6/2007 | Nakano et al. ............. 73/204.26 |
| 2007/0162243 A1 * | 7/2007 | Gelmetti et al. ................ 702/85 |
| 2007/0179728 A1 * | 8/2007 | Kanke et al. ................... 702/100 |
| 2008/0051943 A1 * | 2/2008 | Higuchi ........................ 700/281 |

FOREIGN PATENT DOCUMENTS

| JP | 8-35869 | 2/1996 |
| JP | 08-086677 | 4/1996 |
| JP | 2001-153702 | 6/2001 |
| JP | 2003-156374 | 5/2003 |

OTHER PUBLICATIONS

Japanese Office Action dated Jun. 10, 2010, issued in corresponding Japanese Application No. 2008-142686, with English translation.
Office Action (4 pgs.) dated Feb. 1, 2012 issued in corresponding Japanese Application No. 2008-142686 with an at least partial English-language translation thereof (5 pgs.).

* cited by examiner

*Primary Examiner* — Sujoy Kundu
*Assistant Examiner* — Paul D Lee
(74) *Attorney, Agent, or Firm* — Nixon & Vanderhye PC

(57) ABSTRACT

An air flow measurement device measures a flow amount of air. A flow sensor is configured to output a voltage value corresponding to a given flow amount of the air. A temperature sensor is configured to output temperature of the air. A correction coefficient memory portion is configured to store a correction coefficient for correcting the voltage value of the flow sensor to a corrected voltage value associated with the given flow amount based on a predetermined standard temperature. A relationship between the voltage value of the flow sensor and the flow amount of the air changes based on temperature of the air. A correction portion is configured to correct the output voltage value of the flow sensor to the corrected voltage value using the correction coefficient.

20 Claims, 4 Drawing Sheets

FIG. 3A

| INPUT VOLTAGE (V) \ INTAKE AIR TEMPERATURE (°C) | -40 | 20 | Ta | 80 | 130 |
|---|---|---|---|---|---|
| VD1 | | | | | |
| VD2 | | | | | |
| VD | | | → Gi | | |
| VD3 | | | | | |
| VD4 | | | | | |

FIG. 3B

| FLOW AMOUNT (g/s) \ INTAKE AIR TEMPERATURE (°C) | -40 | 20 | Ta | 80 | 130 |
|---|---|---|---|---|---|
| G1 | | | | | |
| G2 | | | | | |
| Gi | | | → Ki | | |
| G3 | | | | | |
| G4 | | | | | |

| INPUT VOLTAGE (V) \ INTAKE AIR TEMPERATURE (°C) | -40 | 20 | Ta | 80 | 130 |
|---|---|---|---|---|---|
| VD1 | | | | | |
| VD2 | | | | | |
| VD | | → | Ki | | |
| VD3 | | | | | |
| VD4 | | | | | |

AIR FLOW MEASUREMENT DEVICE AND AIR FLOW CORRECTION METHOD

CROSS REFERENCE TO RELATED APPLICATION

The present application is based on Japanese Patent Application No. 2008-142686 filed on May 30, 2008, the disclosure of which is incorporated herein by reference in its entirely.

BACKGROUND OF THE INVENTION

1. Field of the Invention

The present invention relates to an air flow measurement device and air flow correction method for correcting an air flow amount based on temperature and flow amount.

2. Description of the Related Art

In a vehicle engine, methods for controlling the amount of fuel supply to the engine as a function of an intake air flow amount are generally known, as are air flow measurement devices provided in an intake pipe of an engine.

A typical air flow measurement device includes a flow sensor. However, because of measurement variations in each flow sensor, the air flow measurement device must either calibrated before shipment or correct the measurement variation of the flow sensor and output the corrected value of the measurement variation to a control portion such as an ECU of the vehicle. For example, JP-A-11-183220, which corresponds to U.S. Pat. No. 6,321,165, describes an air flow measurement device that corrects a measurement value of a hot wire type flow sensor configured with a temperature-responsive heating resistor and outputs the corrected value.

In a typical hot-wire flow sensor, a measurement value, such as a voltage value, for a given flow amount changes depending on the intake air temperature. Specifically, as shown in FIG. 5, for a flow amount of G1, the output voltage for an intake air temperature of 130° C. is VD3, while the output voltage for the flow amount G1 at an intake air temperature of 20° C. is VD4. A temperature characteristic between the flow amount and the measurement value, such as the output voltage, can be established as shown in FIG. 5.

However, in a typical hot-wire sensor system, such as that described in JP-A-11-183220, the temperature characteristic is not taken into account when the corrected measurement value is output to the engine control portion. In the case where the relationship, for example between the output voltage value and the temperature, is the same for each flow amount measurement, the ratio of correction of, for example, voltage VD 1 to voltage VD2 or voltage VD3 to voltage VD4 as shown in FIG. 5, which can be referred to as a correction coefficient, is the same. However, the relationship between the output voltage value and the temperature based on the flow amount changes for each different flow amount. In such a case, the correction coefficient may depend on the flow amount, and the temperature correction coefficient cannot be determined based on information from only the intake air temperature.

SUMMARY OF THE INVENTION

In view of the above-described and other issues, it is an object of the present invention to provide an air flow measurement device and air flow correction method that can perform a temperature correction with high accuracy. The temperature correction is performed by using a relationship of a flow amount of air, output voltage value of a flow sensor and temperature of an intake air, with the temperature characteristic that is changed based on temperature of the air taken into account.

According to an aspect of the present disclosure, an air flow measurement device for measuring a flow amount of air includes: a flow sensor configured to output a voltage value corresponding to the flow amount of the air; a temperature sensor configured to output a temperature value associated with a temperature of the air; a correction coefficient memory portion configured to store a correction coefficient for correcting the voltage value to a corrected voltage value, the coefficient being based on a relationship between the voltage value and a given flow amount, the relationship changing based on a change in the temperature of the air; a correction portion configured to correct the voltage value to the corrected voltage value using the correction coefficient, the corrected voltage value associated with the flow amount of the air at a standard temperature.

In the above configuration, an air flow measurement device that can perform a temperature correction with high accuracy can be obtained.

According to another aspect of the present disclosure, an air flow correction method includes outputting a voltage value corresponding to a flow amount of air as a flow amount measurement from a flow sensor; outputting temperature of the air, as a detected temperature from a temperature sensor; evaluating a correction coefficient for correcting the output voltage value of the flow sensor associated with the flow amount at the present temperature of the air to voltage value associated with the temperature of the air at a predetermined standard temperature based on a relationship between the output voltage value of the flow sensor and the flow amount of the air, the relationship changing based on a temperature of the air, by using the detected temperature of the air in a correction coefficient memory portion; correcting the output voltage value of the flow sensor by using the correction coefficient to evaluate as a corrected voltage value in a correction portion; and converting frequency of the corrected voltage value.

In the above configuration, the relationship is shown by a map, and thereby, a correction can be performed based on the temperature characteristic that corresponds to the flow amount and the voltage value. In addition, because the frequency conversion is performed in the air flow correction method, when the air flow measurement device is used for a vehicle, an operation in a control portion of the vehicle can be performed with high accuracy.

BRIEF DESCRIPTION OF THE DRAWINGS

The above and other objects, features and advantages of the present invention will become more apparent from the following detailed description made with reference to the accompanying drawings. In the drawings:

FIG. 3A is a schematic diagram illustrating a map of an exemplary flow amount for a given temperature and voltage according to a first embodiment;

FIG. 3B is a schematic diagram illustrating a map of an exemplary correction coefficient for a given temperature and flow amount according to a first embodiment;

DETAILED DESCRIPTION OF THE EXEMPLARY EMBODIMENTS

Hereinafter, embodiments of the present invention will be described with reference to the drawings.

First Embodiment

Figure 1:
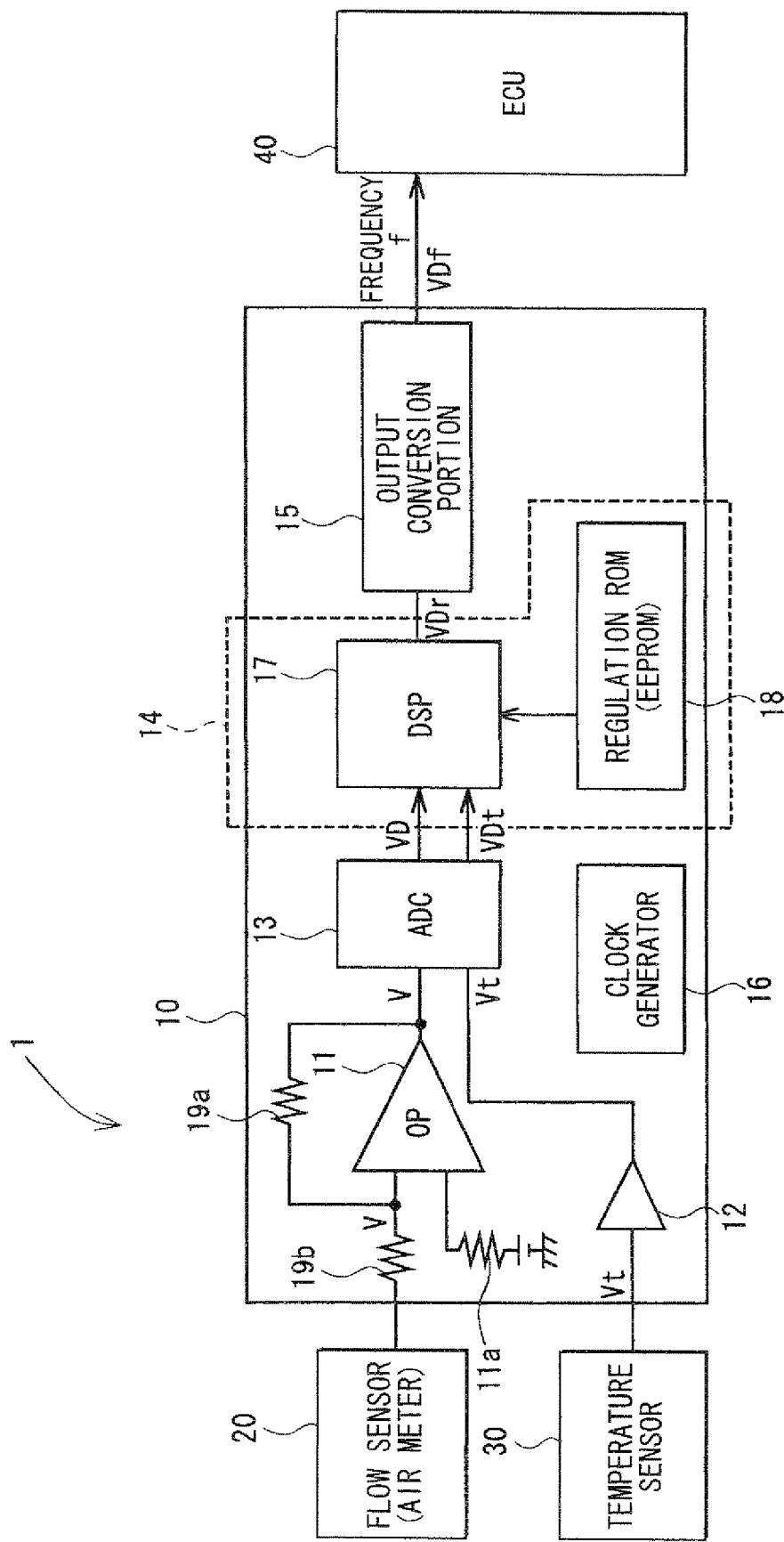
FIG. 1 is a block diagram illustrating an air flow measurement device according to a first embodiment and a second embodiment.

FIG. 1 is a block diagram showing a configuration of an air flow measurement device 1 according to a first embodiment. The air flow measurement device 1 is equipped in a vehicle and is used for measuring an intake air flow amount.

The air flow measurement device 1 includes a correction block 10, an air meter, such as a flow sensor 20, a temperature sensor 30 and an electronic control unit (ECU) 40.

The flow sensor 20 is a hot-wire sensor, for example, and is configured by a silicon semiconductor (not shown). In the hot-wire sensor, a thin film portion is formed on a silicon substrate, and a heater resistor is provided at a center portion of the thin film portion. Temperature sensors for detecting the flow amount are provided at an upstream side and a downstream side relative to an air intake direction with the heater resistor centered. The heater resistor is set to be higher than the intake air temperature by a constant temperature ΔT, and to have a temperature distribution that is symmetrical with respect to the air intake direction with the heater resistor centered is generated at the thin film portion. When air flows into the sensor, temperature difference is generated in accordance with a temperature distribution between the upstream side and the downstream side. Because the flow amount to be measured is a function of the temperature difference, the temperatures in the upstream side and the downstream side of the thin film portion are detected by the temperature sensors. The temperature difference is calculated so that the flow amount can thereby be measured. In the case where the air intake direction is opposite, the temperature distribution between the upstream side and the downstream side is reversed, and the sign of the calculated temperature difference is reversed allowing the air intake direction to be determined. It should be noted that the flow amount G indicates a mass flow rate (g/s).

The temperature sensor 30 detects the intake air temperature and can be distinguished from the above-described temperature sensors associated with the hot-wire sensor, or flow sensor 20 for detecting the flow amount. The temperature sensor 30 outputs a voltage Vt corresponding to the temperature value. The temperature sensor 30 is connected to a power source via a pull-up resistor (not shown).

The correction block 10 includes an operational amplifier 11, a buffer 12, an analog/digital converter (ADC) 13, a correction portion 14, an output conversion portion 15 as a frequency conversion portion and a clock generator 16. The correction portion 14 includes a digital signal processor (DSP) 17 as a correction processing portion and a regulation ROM 18, which can be an electrically erasable programmable read only memory (EEPROM) as a correction coefficient memory portion.

The operational amplifier 11 constitutes an amplifier circuit. One of input terminals of the operational amplifier 11 is connected to an output terminal of the flow sensor 20 via a resistor 19b. The one input terminal is also connected to an output terminal of the operational amplifier 11 via a feedback resistor, such as resistor 19a. The other input terminal is connected to ground via a resistor 11a. According to such a configuration, the operational amplifier 11 amplifies voltage V output from the flow sensor 20 to output the amplified voltage V. The amplified voltage V output from the operational amplifier 11 is input to the ADC 13.

The temperature sensor 30 is separated from the impedance of a circuit side of the correction block 10. The buffer 12 is connected to an output terminal of the temperature sensor 30.

Voltage Vt output from the buffer 12 is input to the ADC 13, which converts the inputted analog value, voltage V, corresponding to flow amount into a digital value, voltage VD, and outputs the digital value to the correction portion 14. In addition, the ADC 13 converts the voltage Vt corresponding to temperature into digital voltage VDt and outputs the digital voltage VDt to the correction portion 14.

The correction portion 14 corrects the voltage VD and outputs the corrected voltage VDr. The correction is performed by the DSP 17 based on a map stored in the regulation ROM 18. A detailed correction method will be described below.

The output conversion portion 15 converts a frequency of the corrected voltage VDr from the correction portion 14 and outputs the converted voltage. Specifically, pulse wave VDf having frequency f is output in a range of 1 kHz to 10 kHz corresponding to the corrected voltage VDr and is input into the ECU 40.

The clock generator 16 generates an operation clock for operating the correction block 10 including the DSP 17. The operation clock is input into the respective components so as to operate the whole correction block 10 synchronously. It should be noted that an input pathway of the operation clock is omitted from the drawings for simplifying the description.

Figures 4, 5:
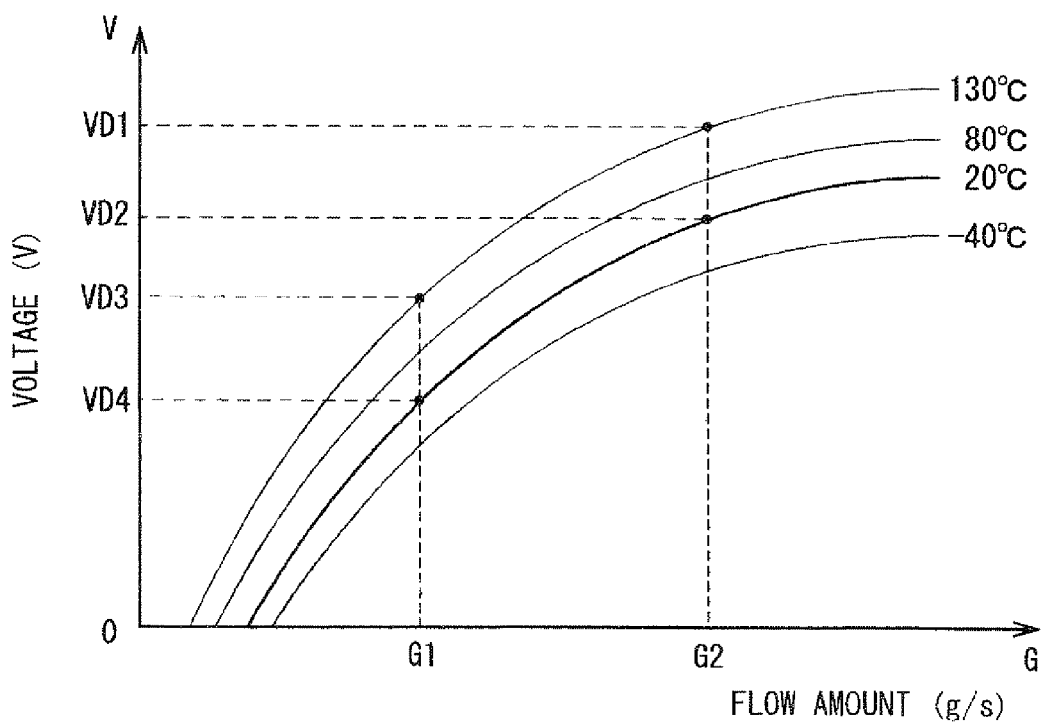
FIG. 4 is a schematic diagram illustrating a map of an exemplary correction coefficient for a given temperature and voltage according to a second embodiment.
FIG. 5 is a graph illustrating a temperature characteristic associated with a flow amount and a voltage.

In a typical hot-wire flow sensor, a measurement value, such as a voltage value, for a given flow amount changes depending on the intake air temperature. Specifically, as shown in FIG. 5, for a flow amount of G1, the output voltage for an intake air temperature of 130° C. is VD3, while the output voltage for the flow amount G1 at an intake air temperature of 20° C. is VD4. In accordance with various embodiments, a temperature characteristic between the flow amount and the measurement value, such as the output voltage, can be established as shown in FIG. 5 for each individual sensor and used for correction as will be described in greater detail hereinafter.

However, in a typical hot-wire sensor system, such as that described in JP-A-11-183220, the temperature characteristic is not taken into account when the corrected measurement value is output to the engine control portion and, instead, only errors due to, for example, differences in resistances of the resistive element are compensated for. In accordance with various embodiments, high accuracy can be obtained by, for example, correcting the output voltage value of the flow sensor for a given flow amount and temperature to a voltage value that is referenced to a standard temperature, such as 20° C., and outputting the corrected voltage value. The correction can be made based on a map of the temperature characteristic represented by output voltages associated with various flow rates and different intake air temperatures.

In a case where the relationship between the output voltage value and the temperature for a given flow amount is the same for each flow amount measurement, a correction coefficient or ratio of correction of, for example, voltage VD1 to voltage VD2 or voltage VD3 to voltage VD4 as shown in FIG. 5, is the same. However, in a practical application, the relationship between the output voltage value and the temperature based on a given flow amount may change for each different flow amount. In such a case, the correction coefficient may depend on the flow amount, and the temperature correction coefficient cannot be determined simply based on information from only the intake air temperature.

Next, correction process in the air flow measurement device according to the present embodiment will be described.

For a given flow amount, the voltage V output from the flow sensor 20 changes based on the intake air temperature. Therefore, in the present embodiment, the voltage VD is corrected after performing the AD conversion by the ADC 13. The voltage VD is corrected to the corrected voltage VDr, which corresponds to and indicates the given flow amount associated with standard temperature such as 20° C. by using the voltage VDt from the temperature sensor 30. For example, as shown in FIG. 5, for the flow amount G2, the voltage VD1 at the intake air temperature of 130° C. is corrected to the corrected voltage VD2 at the standard temperature of 20° C. The correction is performed based on the individual temperature characteristic specific to the flow sensor 20.

Since the relationship between the output voltage value and the temperature may be different for each individual flow amount, in accordance with the above example, in the case where the voltage VD, which is equal to VD1 at the intake air temperature of 130° C., is corrected to the corrected voltage VDr, which is VD2 at the standard temperature of 20° C., when the flow amount is different from G2, the correction coefficient becomes different. Specifically, as shown in FIG. 5, when the correction coefficient associated with correction of the voltage VD1 to the corrected voltage VD2 at the flow amount G2 and the correction coefficient associated with correction of the voltage VD3 to the corrected voltage VD4 at the flow amount G1 are different, the correction cannot be performed by a constant ratio.

Figure 2A:
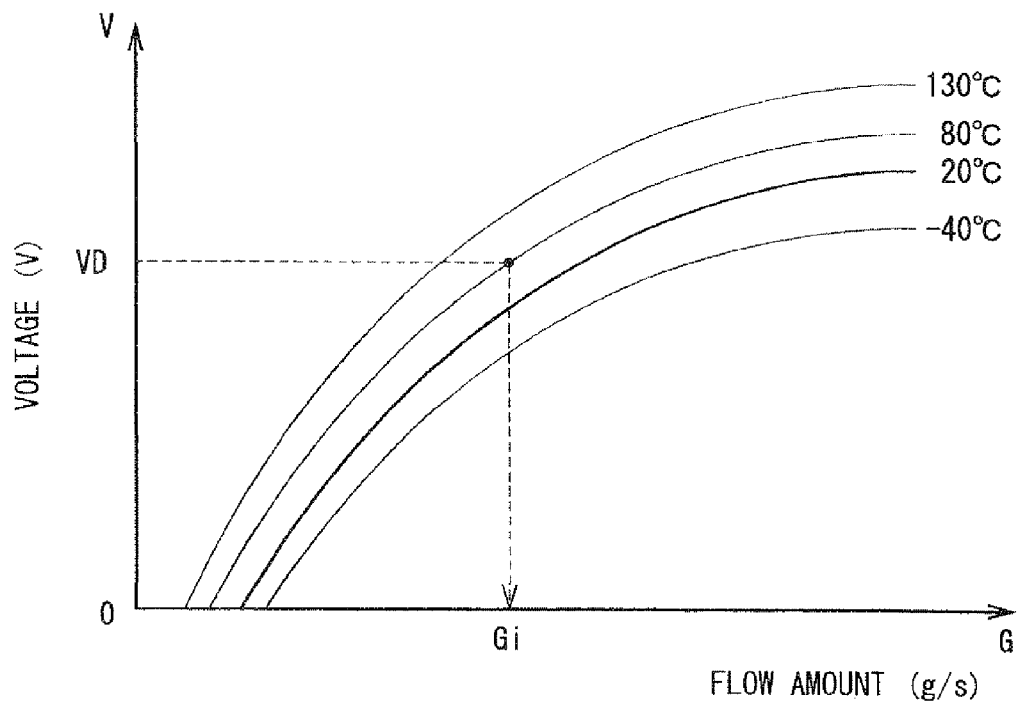
FIG. 2A is a graph illustrating an exemplary correspondence between an air flow and a voltage according to a first embodiment.
Figure 2B:
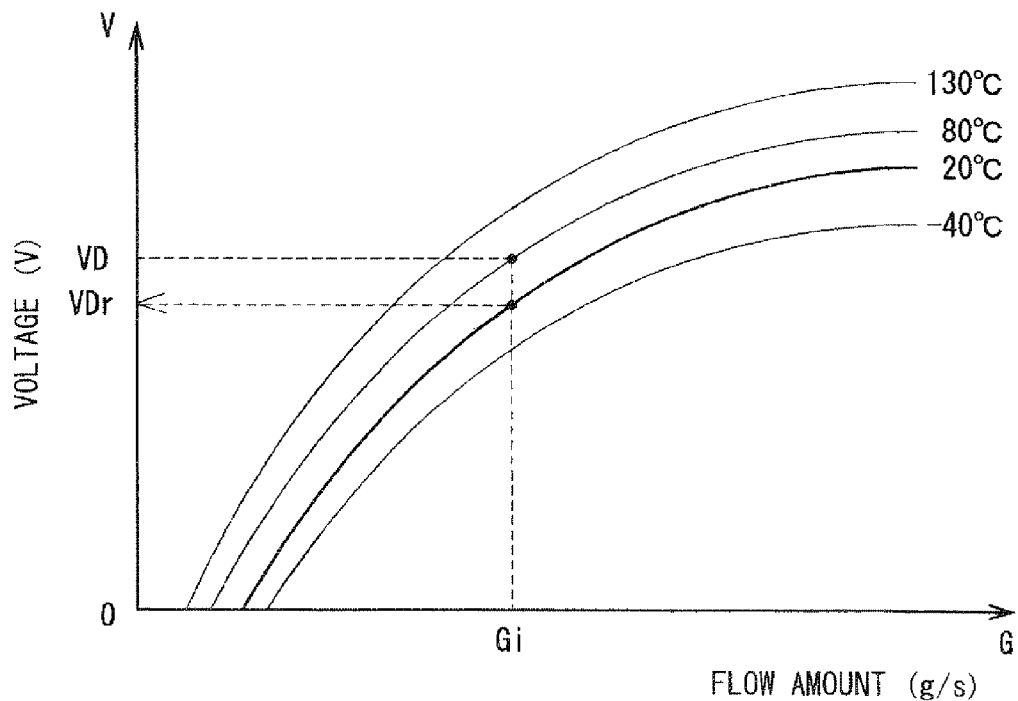
FIG. 2B is a graph illustrating a correction of a voltage according to a first embodiment.

According to the present embodiment, as shown in FIG. 2A, flow amount Gi is evaluated based on voltage VD and the detected intake air temperature, which, in the example, is 80° C. Then, as shown in FIG. 2B, after application of the correction coefficient Ki, for the flow amount Gi and the detected intake air temperature, the corrected voltage VDr is established, which corresponds to the voltage for the flow amount Gi at the standard temperature, such as 20° C. in the present example. The intake air temperature can be input as the voltage Vt from the temperature sensor 30 as shown, for example, in FIG. 1.

More specifically, it will be appreciated that the correction coefficient Ki can be evaluated with reference to the two maps shown in FIGS. 3A and 3B. The expression for the correction coefficient Ki is indicated in the relation shown below as Equation (1). In the equation, Va is a sensor specific voltage for a given flow amount Gi at the standard temperature, such as 20° C., and Vb is a voltage for the given flow amount Gi at arbitrary temperature Tb.

$$Ki = Vb/Va \quad (1)$$

The maps shown in FIG. 3A and FIG. 3B can made based on a series of actual measured temperature characteristic of the flow sensor 20. The maps are stored in the regulation ROM 18 of the correction portion 14 in advance. It should be understood that the temperature characteristic of the flow sensor 20 is an individual temperature characteristic associated with each flow sensor 20. Because there are natural variations between individual ones of the same type product, the temperature characteristic of each flow sensor 20 is mapped and stored in each regulation ROM 18.

The map shown in FIG. 3A, which will be referred to hereinafter for simplicity as a first map, indicates a series of flow amounts Gn corresponding to different input voltages (V) and different intake air temperatures (° C.). With reference to the first map, a flow amount Gi is mapped from an input voltage of VD and an intake air temperature of Ta. In FIG. 3A, the input voltage and the intake air temperature voltage include a plurality of discrete values such as a discrete subset of all possible values. FIG. 3A shows that the number of the input voltage and intake air temperature values is 5 to 10 in order to minimize the map capacity and to increase the accuracy of the map. The flow amount Gi is generally obtained by an interpolation calculation based on the first map. In the present embodiment, linear interpolation is performed by using adjacent two points. That is, a linear function is derived by using the adjacent two points, and a point between the adjacent two points is calculated by using the linear function. A quadratic interpolation calculation by using two or more points and calculation by using the quadratic function or other or additional interpolation function, may be performed.

Specifically, the first map can be filled with discrete intake air temperatures such as T1, T2, T3, T4 and so on and discrete input voltages such as VD1, VD2, VD3, VD4 and so on. A flow amount Gi that corresponds to the combination of these values is determined. The correction portion performs interpolation calculation based on the first map so that the flow amount Gi is evaluated. The interpolation calculation refers to a calculation where a set of discretely plotted points is approximated by a linear function or a function that has higher degree than the linear function and values that lie between the discretely plotted points are evaluated by the function. Using interpolation, the size of the first map can be minimized, and the memory capacity of the correction coefficient memory portion can be further minimized, and the circuit size can be reduced.

The map shown in FIG. 3B, which will be referred to hereinafter for simplicity as a second map, indicates a series of correction coefficients Kn corresponding to various the flow amounts Gn (g/s) and various values of the intake air temperature (° C.). By referring to the second map, a correction coefficient Ki at the flow amount of Gi and the intake air temperature of Ta is evaluated. In FIG. 3B, the flow amount and the intake air temperature include a plurality of discrete values, such as a discrete subset of all possible values. FIG. 3B shows that the number of values of the intake air temperature and the flow amount is 5 to 10. The correction coefficient Ki is generally obtained by an interpolation calculation based on the second map. In the present embodiment, linear interpolation is performed by using adjacent two points. Quadratic or more of interpolation calculation by using two points or more may be performed.

The second map can be filled with discrete intake air temperatures such as T1, T2, T3, T4 and so on and discrete flow amounts such as G1, G2, G3, G4 and so on can be used. The correction coefficient that corresponds to the combination of these values can be determined. The correction portion performs interpolation calculation based on the second map so as to minimize the size of the second map and the memory capacity of the correction coefficient memory portion. As a result, the circuit size can be reduced.

It will be appreciated that the DSP 17 corrects the voltage VD using the correction coefficient Ki and outputs the corrected voltage VDr. The relation between the correction coefficient Ki and the corrected voltage VDr, which is the voltage that corresponds to the given flow rate Gi at standard temperature, is shown in Equation (2) below. The frequency of the corrected voltage VDr is converted by the output conversion portion 15, and the converted voltage is output to the ECU 40.

$$VDr=VD/Ki \quad (2)$$

Next, an effect of the air flow measurement device 1 according to the present embodiment will be described.

In the present embodiment, the flow sensor 20 outputs the voltage VD as the measurement value. In addition, the temperature sensor 30 outputs the voltage Vt corresponding to the intake air temperature Ta. The regulation ROM 18 stores the first map indicating various flow amounts Gn corresponding to various values of the input voltage (V) and the intake air temperature (° C.). By referring to the first map, the flow amount Gi at the input voltage of VD and the intake air temperature of Ta is evaluated. The regulation ROM 18 further stores the second map indicating the various correction coefficients Kn corresponding to various values of the flow amount (g/s) and the intake air temperature (° C.). By referring to the second map, the correction coefficient Ki at the flow amount of Gi and the intake air temperature of Ta is evaluated. The voltage VD is corrected by using the correction coefficient Ki. Thereby, the correction based on the temperature characteristic that makes the connection between the flow amount and the voltage can be achieved.

In the present embodiment, the voltage VD is corrected by referring to the first map and the second map. Therefore, the correction can be easily performed. In the first map, the input voltage and the intake air temperature include a plurality of discrete values such as a discrete subset of all possible values. Similarly, in the second map, the flow amount and the intake air temperature include a plurality of discrete values such as a discrete subset of all possible values. Thereby, the sizes of the first map and the second map are minimized, and the memory capacity of the regulation ROM 18 and the circuit size can be reduced.

In the present embodiment, the output conversion portion 15 outputs the pulse wave VDf having frequency f in the range of 1 kHz to 10 kHz corresponding to the corrected voltage VDr into the ECU 40. Thereby, the detection accuracy of the flow amount in the ECU of the vehicle can be increased.

Second Embodiment

A second embodiment has a similar configuration to a first embodiment. However, a map stored in the regulation ROM 18 is different from that of a first embodiment. In the present embodiment, the map stored in the regulation ROM 18 will be described. With respect to the similar portion or corresponding portion with one included in a first embodiment, the same reference numerals are indicated.

The map shown in FIG. 4, which will be referred to hereinafter for simplicity as a third map, indicates a correction coefficient K corresponding to input voltage (V) and intake air temperature (° C.). In a first embodiment, the correction coefficient K is evaluated based on two maps, that is, the first map and the second map. The third map is a combination of the first map and the second map. By using the third map, the correction coefficient Ki can be evaluated directly without calculating the flow amount G when the input voltage is VD and the intake air temperature is Ta. As a first embodiment, the third map shows that the number of the input voltage and the intake air temperature is 5 to 10. Thus, the correction coefficient Ki is generally obtained by interpolation calculation based on the third map. In the present embodiment, linear interpolation is performed by using adjacent two points. Quadratic or more of interpolation calculation by using two points or more may be performed.

Specifically, the intake air temperature can be filled with discrete intake air temperatures such as T1, T2, T3, T4 and so on and the input voltage can be filled with discrete intake air temperatures such as VD1, VD2, VD3, VD4 and so on. The correction coefficient that corresponds to the combination of these values can be determined. The correction portion performs an interpolation calculation, defined as described above, based on the third map. The size of the third map can be minimized, and the memory capacity of the correction coefficient memory portion and the circuit size can be reduced.

Next, an effect of the air flow measurement device 1 according to the present embodiment will be described. Basically, the effect obtained by the present embodiment is similar to that obtained by a first embodiment.

As shown in FIG. 4, the third map is used in the present embodiment in place of the first map and the second map. By referring to the third map, the calculation of the flow amount G is not required. Therefore, the correction can be further easily performed. In the third map, the input voltage and the intake air temperature include a plurality of discrete values such as a discrete subset of all possible values. Thereby, the capacity of the third map is minimized, and the memory capacity of the regulation ROM 18 can be further minimized compared to a first embodiment. Therefore, the circuit size can be downsized.

Other Embodiments

In the above embodiments, the correction block 10 includes the output conversion portion 15, and the frequency conversion is performed by the output conversion portion 15. In contrast, the corrected voltage VDr may be output to the ECU 40 directly.

In the above described embodiments, the voltage VD is corrected with respect to the flow amount G based on the temperature characteristic of the flow sensor 20 shown in FIG. 5. There are variations of temperature characteristic between the same type sensors such as a sensor product A, the temperature characteristic of each flow sensor 20 is mapped and stored in the regulation ROM 18.

Similarly, there are variations of temperature characteristic between different type sensors such as sensor products A and B. Therefore, there are variations between voltage of sensor product A and voltage of sensor product B at standard temperature such as 20° C. with respect to the same flow amount G. The variations of the voltages with respect to the flow amount at the standard temperature may be corrected by referring to the correction coefficient of the variations stored in a memory device of the flow sensor in advance. Thereby, the same voltage value can be output to the ECU 40 between the different sensor products. Regarding the ECU 40, variations of the flow sensors 20 can be decreased and flow amount signals can be detected with high accuracy.

The present application has been described as an air flow measurement device and an air flow correction method. However, various embodiments as described herein can be applied to other devices and methods such as a computer device or related method.

While the invention has been described herein with reference to various embodiments, it is to be understood that the invention is not limited to the embodiments and constructions described herein. The invention is intended to cover various modification and equivalent arrangements. In addition, while the various combinations and configurations are described herein, other combinations and configurations are contemplated as being within the scope of the invention.

What is claimed is:

1. An air flow measurement device for measuring a flow amount of air, the device comprising:
a flow sensor configured to output a voltage value corresponding to the flow amount of the air as a given flow amount;
a temperature sensor configured to detect a temperature of the air under all operable conditions and output a temperature value of the detected temperature;
a correction block comprising a correction coefficient memory and a correction processing portion, the correction coefficient memory portion configured to store a map that indicates a correction coefficient corresponding to the voltage value and the temperature value; the correction processing portion configured to correct the voltage value to a corrected voltage value using the correction coefficient, the corrected voltage value being associated with the given flow amount of the air at a standard temperature, wherein
the flow amount of the air is measured from the corrected voltage value,
the temperature sensor is located outside the correction block; and
the temperature sensor is located outside the flow sensor.

2. The air flow measurement device according to claim 1, wherein
the map includes a discrete subset of correction coefficients corresponding to a discrete subset of temperature values and a discrete subset of voltage values, and
the correction processing portion calculates the correction coefficient by performing an interpolation calculation based on the map.

3. The air flow measurement device according to claim 1, further comprising:
a frequency conversion portion configured to output the corrected voltage value calculated by the correction processing portion with a predetermined frequency.

4. The air flow measurement device according to claim 1, wherein the correction processing portion includes a digital signal processor.

5. The air flow measurement device according to claim 1, wherein the correction block further comprises a buffer which is connected to an output terminal of the temperature sensor.

6. The air flow measurement device according to claim 1, wherein:
the flow sensor includes a heater resistor and a pair of temperature sensors provided at an upstream side and a downstream side relative to an intake direction of the air with the heater resistor centered,
the heater resistor is set to be higher than the temperature of the air by a constant temperature.

7. The air flow measurement device according to claim 1, wherein:
the flow sensor includes a pair of temperature sensors for calculating a temperature difference used to measure the flow amount of the air; and
the temperature sensor is located outside the flow sensor including the pair of temperature sensors.

8. The air flow measurement device according to claim 7, wherein:
the flow sensor further includes a heater resistor set to be higher than the intake air temperature by a constant temperature;
wherein each one of the pair of temperature sensors is located on opposite sides of the heater resistor.

9. A method of correcting a measurement of a flow amount of air, the method comprising:
outputting a voltage value from a flow sensor as a flow amount measurement, the voltage value and the flow amount measurement corresponding to the flow amount of the air as a given flow amount;
detecting a temperature of the air by a temperature sensor under all operable conditions, the detecting the temperature including outputting a temperature value of the detected temperature from the temperature sensor;
evaluating a correction coefficient that corrects the voltage value of the flow sensor to a corrected voltage value, the corrected voltage value being associated with the given flow amount at a standard temperature;
storing a map in a correction coefficient memory portion, the map indicating a correction coefficient corresponding to the voltage value and the temperature value;
correcting, using a digital signal processor, the voltage value of the flow sensor to the corrected voltage value using the correction coefficient, the correction coefficient memory portion and the digital signal processor being components of a correction block; and
outputting the corrected voltage value with a converted frequency, wherein
the temperature sensor is located outside the correction block; and
the temperature sensor is located outside the flow sensor.

10. The method according to claim 9, wherein a buffer is connected to an output terminal of the temperature sensor.

11. The method according to claim 9, wherein:
the flow sensor includes a heater resistor and a pair of temperature sensors provided at an upstream side and a downstream side relative to an intake direction of the air with the heater resistor centered,
the heater resistor is set to be higher than the temperature of the air by a constant temperature.

12. The method according to claim 9, further comprising:
calculating a temperature difference between measurements of a pair of temperature sensors included in the flow sensor;
wherein the temperature sensor is located outside the flow sensor including the pair of temperature sensors.

13. The method according to claim 12, wherein:
the flow sensor further includes a heater resistor set to be higher than the intake air temperature by a constant temperature;
wherein each one of the pair of temperature sensors is located on opposite sides of the heater resistor.

14. A method of correcting a measurement of a flow amount of air, the method comprising:
outputting a voltage value from a flow sensor, the voltage value corresponding to the flow amount of the air as a given flow amount;
detecting a temperature of the air by a temperature sensor under all operable conditions, the detecting the temperature including outputting a temperature value of the detected temperature from the temperature sensor;
storing a map in a correction coefficient memory portion, the map indicating a correction coefficient corresponding to the voltage value and the temperature value; and
determining a correction coefficient, using a digital signal processor, to correct the voltage value to a corrected voltage value associated with the given flow amount at a standard temperature, wherein the correction coefficient memory portion and the digital signal processor are components of a correction block;

the temperature sensor is located outside the correction block; and the temperature sensor is located outside the flow sensor.

15. The method according to claim 14, wherein the map includes a discrete subset of correction coefficients corresponding to a discrete subset of temperature values and a discrete subset of voltage values, the method further comprising calculating the correction coefficient by interpolation based on ones of the discrete subset of temperature values and the discrete subset of voltage values in the map that are adjacent to the temperature value and the voltage value.

16. The method according to claim 14, further comprising outputting the corrected voltage value with a predetermined frequency.

17. The method according to claim 14, wherein a buffer is connected to an output terminal of the temperature sensor.

18. The method according to claim 14, wherein the flow sensor includes a heater resistor and a pair of temperature sensors provided at an upstream side and a downstream side relative to an intake direction of the air with the heater resistor centered, the heater resistor is set to be higher than the temperature of the air by a constant temperature.

19. The method according to claim 14, further comprising:

calculating a temperature difference between measurements of a pair of temperature sensors included in the flow sensor;

wherein the temperature sensor is located outside the flow sensor including the pair of temperature sensors.

20. The method according to claim 19, wherein:

the flow sensor further includes a heater resistor set to be higher than the intake air temperature by a constant temperature;

wherein each one of the pair of temperature sensors is located on opposite sides of the heater resistor.

* * * * *